United States Patent
Thorvaldson, Sr.

(10) Patent No.: US 7,090,305 B2
(45) Date of Patent: Aug. 15, 2006

(54) VEHICLE DUMP BODY ELEVATION DEVICE, KIT, AND METHOD RELATING THERETO

(75) Inventor: Eric E Thorvaldson, Sr., Grafton, VA (US)

(73) Assignee: Stealth Dump Trucks, Inc., Grafton, VA (US)

( * ) Notice: Subject to any disclaimer, the term of this patent is extended or adjusted under 35 U.S.C. 154(b) by 152 days.

(21) Appl. No.: 10/820,909

(22) Filed: Apr. 8, 2004

(65) Prior Publication Data
US 2005/0225159 A1 Oct. 13, 2005

(51) Int. Cl.
B65G 67/48 (2006.01)
(52) U.S. Cl. .......................................... 298/10; 298/1 A
(58) Field of Classification Search .................. 298/10, 298/17 R, 22 R, 1 A, 19 R
See application file for complete search history.

(56) References Cited

U.S. PATENT DOCUMENTS

| 2,674,489 | A | * | 4/1954 | Maxon, Jr. ................. 298/17 R |
| 2,684,864 | A | * | 7/1954 | Anthony .................... 298/22 P |
| 2,849,255 | A | | 8/1958 | Pasker |
| 3,043,629 | A | | 7/1962 | Schlueter et al. |
| 3,279,854 | A | | 10/1966 | Daubresse |
| 3,363,944 | A | | 1/1968 | LaBlanche |
| 3,594,042 | A | | 7/1971 | Gauch |
| 3,600,038 | A | * | 8/1971 | Jones et al. ................. 298/22 P |
| 3,740,097 | A | * | 6/1973 | Parker et al. ............... 298/1 A |
| 3,833,261 | A | * | 9/1974 | Dingler ....................... 298/1 A |
| 3,883,020 | A | * | 5/1975 | Dehn ........................... 414/498 |
| 4,019,781 | A | * | 4/1977 | Ray ............................. 298/22 J |
| 4,056,283 | A | * | 11/1977 | Pow ............................ 298/17.6 |
| 4,066,296 | A | | 1/1978 | Ray et al. |
| 4,148,528 | A | | 4/1979 | Channell |
| 4,168,861 | A | | 9/1979 | Carroll |
| 4,176,881 | A | | 12/1979 | Cole |
| 4,178,998 | A | | 12/1979 | Rockwell |
| 4,210,314 | A | | 7/1980 | Carroll |
| 4,296,833 | A | | 10/1981 | Ashworth |
| 4,476,955 | A | | 10/1984 | Carter |
| 4,480,871 | A | | 11/1984 | Fox |
| 4,592,593 | A | | 6/1986 | Channell |
| 4,632,262 | A | | 12/1986 | Olsen et al. |
| 4,741,576 | A | | 5/1988 | Jones |
| 5,048,896 | A | | 9/1991 | Channell |
| 5,074,622 | A | | 12/1991 | Channell |
| 5,447,361 | A | * | 9/1995 | Phillips ....................... 298/1 A |
| 5,466,112 | A | * | 11/1995 | Feller .......................... 414/528 |
| 5,513,901 | A | | 5/1996 | Smith et al. |
| 5,580,134 | A | | 12/1996 | Allwine |
| 5,836,657 | A | * | 11/1998 | Tilley et al. ................ 298/1 A |
| 5,934,491 | A | | 8/1999 | Cullity |

(Continued)

OTHER PUBLICATIONS

EZ Dumper—Dump Inserts—web page http://www.ez-dumper.com/—printed Jul. 18, 2005.*

*Primary Examiner*—H. Gutman
(74) *Attorney, Agent, or Firm*—Joy L. Bryant (57) ABSTRACT

The present invention is directed toward a vehicle dump body elevation device, kit and method related thereto. The elevation device and kit comprise at least one hinge assembly for attaching a dump body to a vehicle frame and at least one hoist having a lower end pivotally attached to the vehicle frame and an upper end pivotally attached to the dump body. The kit permits easy installation without modification of the vehicle's structural components and it permits dumping over the vehicle's bumper and other frame mounted accessories.

40 Claims, 7 Drawing Sheets

U.S. PATENT DOCUMENTS

| | | | |
|---|---|---|---|
| 6,092,966 A * | 7/2000 | Martin et al. ............... 298/22 P |
| 6,186,596 B1 | 2/2001 | Jones |
| 6,257,670 B1 | 7/2001 | Rogers |
| 6,371,564 B1 * | 4/2002 | Yates et al. ................ 298/1 A |
| 6,371,565 B1 | 4/2002 | Libhart |
| 6,561,589 B1 | 5/2003 | Jones |
| 2002/0036425 A1 | 3/2002 | Jones |
| 2003/0194273 A1 | 10/2003 | Lloyd |

* cited by examiner

VEHICLE DUMP BODY ELEVATION DEVICE, KIT, AND METHOD RELATING THERETO

FIELD OF THE INVENTION

The present invention relates to an aftermarket kit and method for modifying a pickup truck into a dump truck without impairing the structural integrity of the vehicle. In particular, the present invention employs a novel scissor hoist and hinge combination.

BACKGROUND OF THE INVENTION

A number of systems currently exist for converting a pickup truck to a dump truck. A typical conversion kit employs a hinge to pivot the rear of the truck bed on the truck frame and an under body hoist to tilt the front of the truck bed to the dumping position. However, installation of these kits requires vehicle alteration which complicates installation and negatively impacts the safety and towing capacity of the altered truck.

U.S. Pat. No. 6,561,589 to Jones describes a dump truck hinge wherein the raising and lowering operation pivots the bed about a rear hinge connected in conventional fashion at and between the rear ends of the frame members. When this configuration is used to pivot a pickup truck bed, the hinge causes the tailgate to interfere with frame mounted equipment such as the exhaust system, spare tire carrier, rear bumper, tow hitch, and receivers. Thus, to convert the truck using this configuration, the frame mounted equipment must be removed completely or modified. Such modifications add considerable expense to dump truck conversions, lessen or eliminate the vehicle's towing capacity, and interfere with the aesthetic appearance of the truck itself.

Rather than discard the bumper, some conversions weld, or otherwise attach the bumper to the truck bed. U.S. Pat. No. 4,019,781 to Ray provides hinges that are fixedly attached to the underside of the hauling bed adapted for rotatable engagement with the rear of the truck frame. Extensions extending from the bumper are trimmed and, as so modified, are fixedly attached to hinge plate members. In this way, the bumper rotates with the hinge plate members as the bed is tilted. While this configuration provides a method of mounting the rear bumper, no provision is made to prevent the bumper or tailgate from interfering with the tow hitch and/or receivers. Furthermore, towing capacity and crash protection are limited by such bumper mounting modifications, hinges, hinge mounting, and hoist mechanisms as described by Ray.

When converting a pickup truck to a dump truck, space considerations make it impractical to use a separate hoist to elevate the rear of the dump body over the rear bumper and accessories. Other known methods of elevating the rear of a dump body are likewise not practical for pickup truck conversions. For example, U.S. Pat. No. 5,513,901 to Smith et al. describes a hoist mechanism having a moving instant center of body rotation. As the lift progresses a back link raises the rearward end of the dump body. In a short-body version of the apparatus, a forward transverse member is moved rearwardly toward the intermediate transverse member, shortening the hoist subframe. The hoist mechanism is preferably constructed with a mounting height of twelve inches. This raises the bed of a pickup truck higher than the cab when the bed is positioned in the lowered position and is aesthetically unappealing. In addition, because of space limitations, the short-body version requires more space than is available on a short bed pickup truck and thus is not feasible.

An object of the present invention is to provide a dump truck elevation device that can be installed on a pickup truck without alteration of the vehicle frame, rear bumper, bumper mounts, spare tire carrier, towing hitches or receivers, while preserving the aesthetic appearance of the truck itself.

Another object of the present invention is to provide a dump truck elevation device that permits dumping over the vehicle's bumper and other frame mounted accessories.

Another object of the present invention is to provide a dump truck elevation device that is easy to install.

SUMMARY OF THE INVENTION

The present invention is directed toward a vehicle dump body elevation device comprising at least one hinge assembly for attaching a dump body to a vehicle frame. The hinge assembly has a lowered position wherein the dump body is substantially horizontal and a raised position wherein a front portion of the dump body is elevated higher than a rear portion of the dump body. The rear portion of the dump body is elevated clear of a rear bumper mounted on the vehicle frame. The hinge assembly moves both the front and the rear portions of the dump body upwardly while pivoting the dump body to the raised position. The device also comprises at least one hoist having a lower end pivotally attached to the vehicle frame and an upper end pivotally attached to the dump body.

The invention further embodies a kit for modifying a vehicle to function as a dump truck. The kit comprises at least one hinge assembly to move a dump body between a lowered position, wherein the dump body is substantially horizontal, and a raised position, wherein a front portion of the dump body is elevated higher than a rear portion of the dump body. The rear portion of the dump body is elevated clear of a rear bumper mounted on a vehicle frame. The hinge assembly moves both the front and the rear portions of the dump body upwardly, while pivoting the dump body to the angled position. The kit further includes at least one hoist having a first means for pivotal attachment to the vehicle frame and a second means for pivotal attachment to the dump body.

Another embodiment of the invention is a method of converting a vehicle from a fixed bed vehicle to a dump truck. In practicing the method, a fixed bed is removed from a vehicle. A vehicle dump body elevation device comprising at least one hinge assembly is provided. The hinge assembly moves a dump body between a lowered position, wherein the dump body is substantially horizontal, and a raised position, wherein a front portion of the dump body is elevated higher than a rear portion of the dump body. The rear portion of the dump body is elevated clear of a rear bumper mounted on the vehicle frame. The hinge assembly moves both the front and the rear portions of the dump body upwardly, while pivoting the dump body to the raised position. The vehicle dump body elevation device also comprises at least one hoist having a first means for pivotal attachment to a vehicle frame and a second means for pivotal attachment to the dump body. The hinge assembly and the hoist are mounted to the vehicle frame and the dump body.

BRIEF DESCRIPTION OF THE DRAWINGS

The accompanying drawings illustrate a complete embodiment of the invention according to the best modes so far devised for the practical application of the principles thereof, and in which.

To simplify the reading of this specification, the following numbers correspond to the elements listed below:

| | |
|---|---|
| 10 | Vehicle Dump Body Elevation Device |
| 20 | Hinge Assembly |
| 25 | First Hinge Assembly |
| 27 | Second Hinge Assembly |
| 28 | Torsion Bar |
| 30 | Dump Body |
| 32 | Underside of Dump Body |
| 33 | Front Portion of Dump Body |
| 35 | Rear Portion of Dump Body |
| 37 | Tail gate |
| 40 | Rear Bumper |
| 50 | Hoist |
| 55 | Hoist Lower End |
| 57 | Hoist Upper End |
| 60 | Vehicle Frame |
| 70 | Front Link Member |
| 80 | Main Link Member |
| 85 | Main Link Member First End |
| 87 | Main Link Member Second End |
| 90 | Main Link Member Attachment Means |
| 100 | Rear Link Member |
| 105 | Rear Link Member First End |
| 107 | Rear Link Member Second End |
| 110 | Center Linking Member |
| 112 | Center Linking Member First End |
| 114 | Center Linking Member Second End |
| 115 | Center Linking Member Mounting Means |
| 120 | Scissor Hoist Mechanism |
| 130 | Channeled Hinge |
| 131a | Safety Pin Active Hole |
| 131b | Safety Pin Active Hole |
| 132 | First Upwardly Extending End of Channeled Hinge |
| 133 | Lower Pivot Pins |
| 134 | Lower Pivot Pins |
| 135 | Second Upwardly Extending End of Channeled Hinge |
| 136a | Safety Pin Storage Holes |
| 136b | Safety Pin Storage Holes |
| 137 | Space defined by First and Second Upwardly Extending Ends of Channeled Hinge |
| 138 | Upper Pivot Pins |
| 139 | Upper Pivot Pins |
| 140 | Safety Pin |
| 142 | Two Lower Scissor Arms |
| 144 | Two Lower Scissor Arms |
| 143 | Lower Scissor Arms First End |
| 145 | Lower Scissor Arms First End |
| 147 | Two Lower Scissor Arms Second End |
| 149 | Two Lower Scissor Arms Second End |
| 152 | Two Upper Scissor Arms |
| 154 | Two Upper Scissor Arms |
| 153 | Upper Scissor Arms First End |
| 155 | Upper Scissor Arms First End |
| 157 | Upper Scissor Arms Second End |
| 159 | Upper Scissor Arms Second End |
| 160 | Lifting Means |
| 161 | Lifting Means Extending Member |
| 165 | Lifting Means Base End |
| 167 | Lifting Means Extending End |
| 170 | Pivot Block Means |
| 180 | Hydraulic System |
| 185 | Hydraulic Cylinder |
| 187 | Air Vent |
| 190 | Low Pressure Hose |
| 192 | First End of Low Pressure Hose |
| 194 | Second End of Low Pressure Hose |
| 195 | Reservoir |
| 200 | High Pressure Hose |
| 220 | Valve Assembly |

DETAILED DESCRIPTION OF THE PREFERRED EMBODIMENTS

Figure 1:
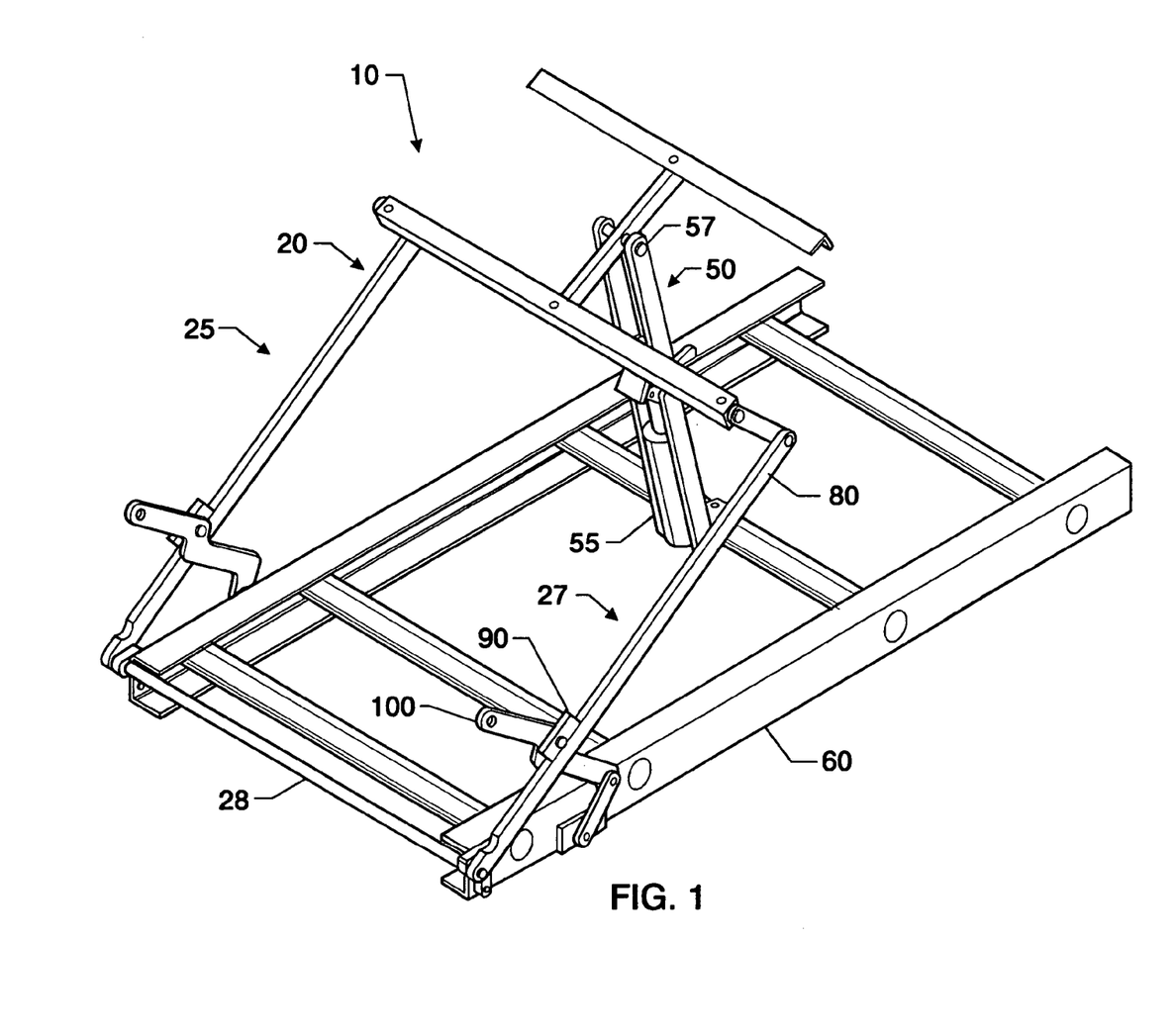
FIG. 1 depicts the vehicle dump body elevation device of the present invention.
Figure 2:
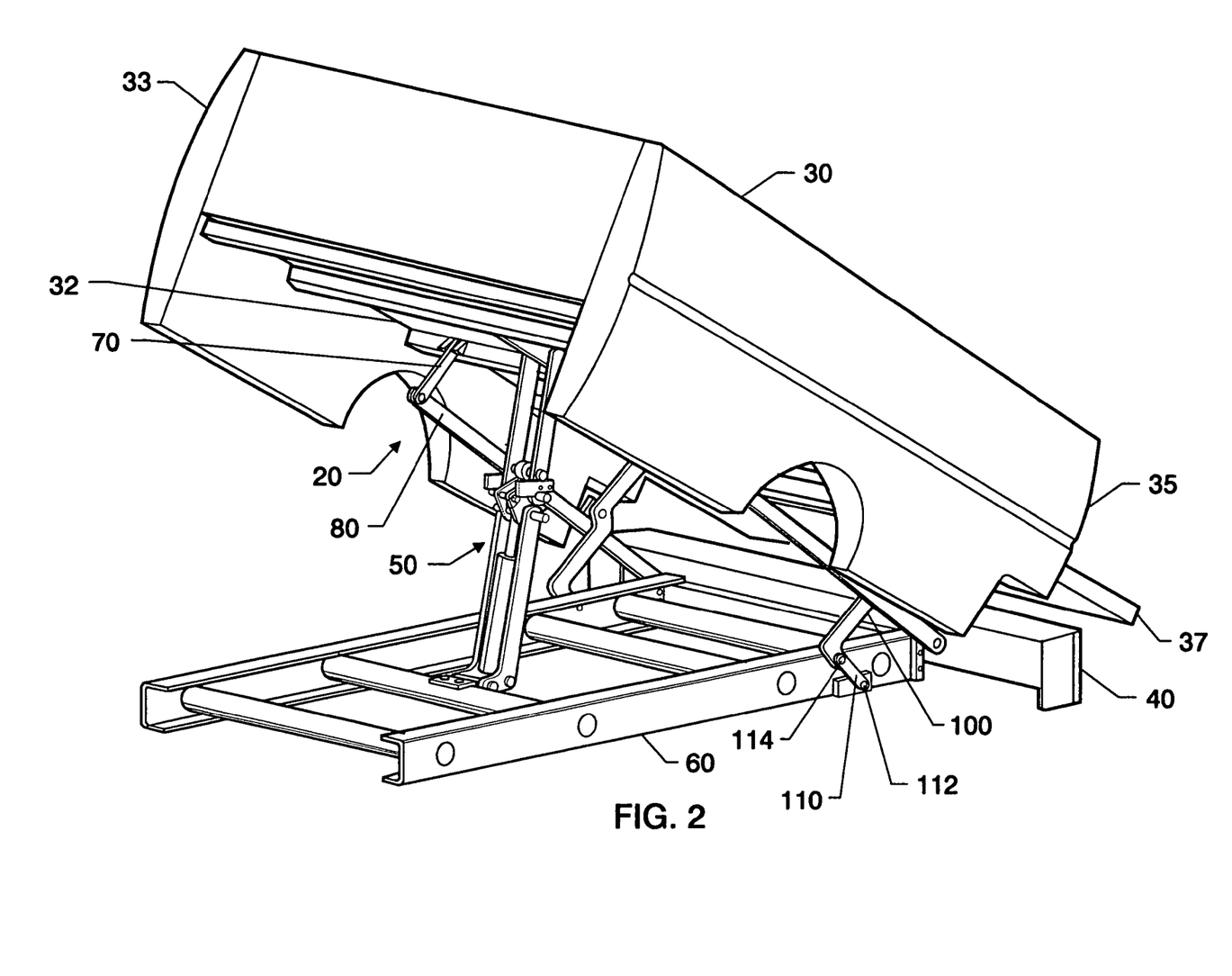
FIG. 2 depicts the vehicle dump body in the raised position.

Referring now to the drawings, where similar elements are numbered the same, FIG. 1 depicts the vehicle dump body elevation device 10 of the present invention. The invention comprises at least one hinge assembly 20. The hinge assembly 20 has a lowered position wherein the dump body (not shown) is substantially horizontal and a raised position wherein a front portion of the dump body is elevated higher than a rear portion of the dump body (FIG. 2). As shown in FIG. 2, during the operation of the hinge assembly 20, the rear portion 35 of the dump body 30 is elevated clear of a rear bumper 40 mounted on the vehicle frame 60. The hinge assembly 20 moves both the front 33 and the rear portions 35 of the dump body 30 upwardly while pivoting the dump body 30 to the raised position. Enough clearance is maintained between the rear portion 35 of the dump body 30 and the rear bumper 40 to allow operation with a tailgate 37 in a lowered position. The lowered tailgate 37 dumps over the rear bumper 40 tow hitch and receivers (not shown). Referring back to FIG. 1, the device 10 also comprises at least one hoist 50 having a lower end 55 pivotally attached to the vehicle frame 60 and an upper end 57 pivotally attached to the dump body (not shown).

Figure 3:
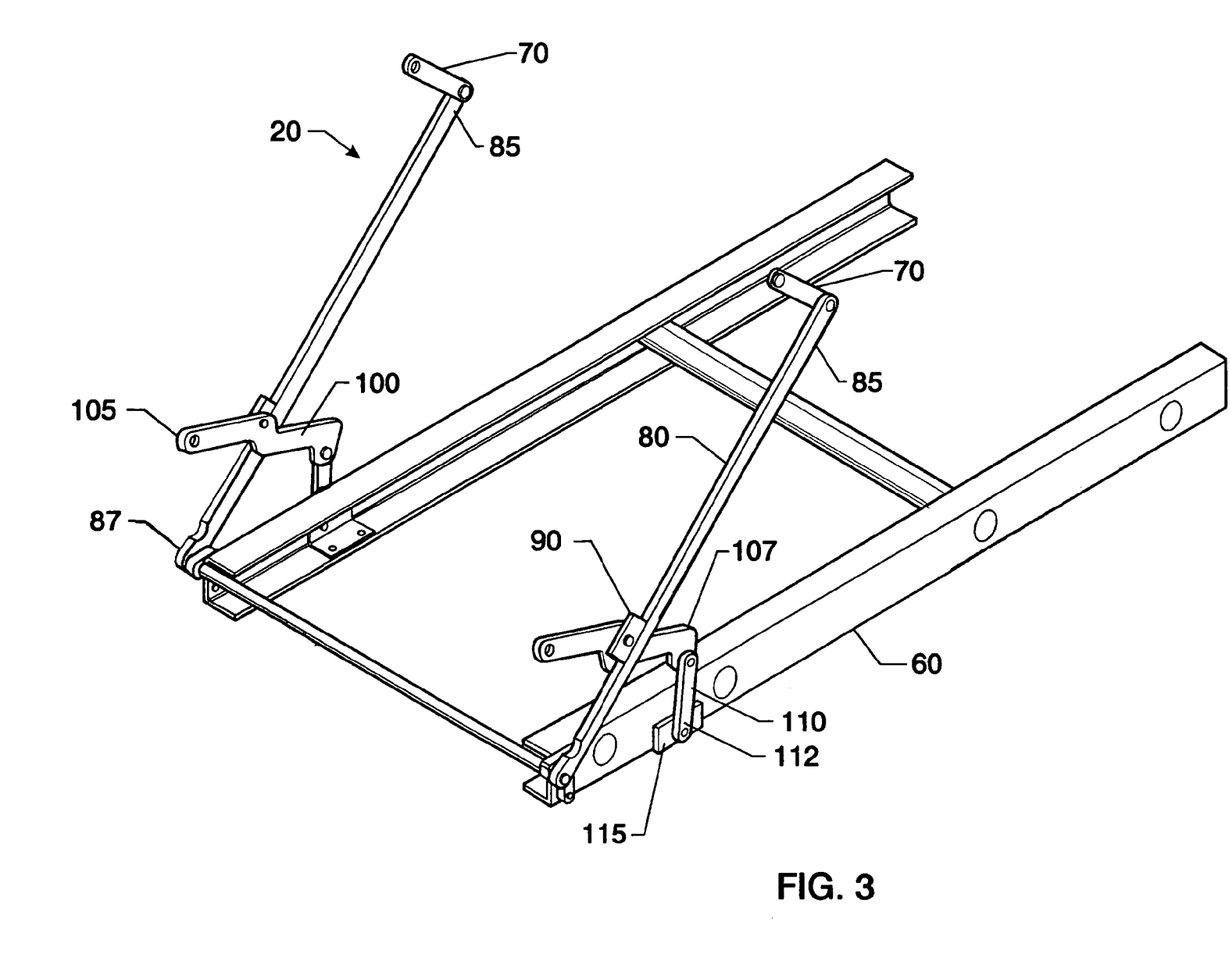
FIG. 3 is a schematic view of the hinge assembly.

FIG. 3 depicts the hinge assembly 20. The hinge assembly 20 further comprises a front link member 70 pivotally mounted to the dump body (not shown). A main link member 80 has a first end 85 pivotally attached to the front link member 70. A second end 87 is pivotally mounted to a vehicle frame 60. An attachment means 90 is disposed therebetween for pivotal attachment to a rear link member 100. The rear link member 100 has a first end 105 pivotally mounted to the dump body (not shown). A second end 107 is pivotally attached to a center linking member 110. A first end 112 of the center linking member 110 has a mounting means 115 for attachment to the vehicle frame.

In a preferred embodiment, the rear link member 100 is pivotally attached to the attachment means 90 of the main link member 80 near the center of the rear link member 100. The attachment means 90 may be any means known to those of skill in the art. Preferably, the attachment means 90 is a pivot mount fixedly attached to the main link member 80.

In an alternative embodiment of the invention, as shown in FIG. 1, at least one hoist 50 is disposed between a first hinge assembly 25 and a second hinge assembly 27. Although only one hoist is depicted in the figure, more than one hoist may be employed in practicing the present invention. To prevent twisting of the dump body (not shown), a torsion bar 28 is disposed between and attached to the first hinge assembly 25 and the second hinge assembly 27. The torsion bar 28 keeps the first hinge assembly 25 and the second hinge assembly 27 working in unison. As shown in FIG. 2, the front link members 70 are pivotally mounted to an underside 32 of the dump body 30. The first end 112 of the center linking member 110 is pivotally mounted to the vehicle frame 60, and a second end 114 of the center linking member 110 is pivotally attached to the rear link member 100. Referring back to FIG. 1, the rear link member 100 is pivotally attached to the attachment means 90 of the main link member 80 near the center of the rear link member 100. The attachment means 90 may be any means known to those of skill in the art, and preferably is a pivot mount fixedly attached to the main link member 80.

Figure 4:
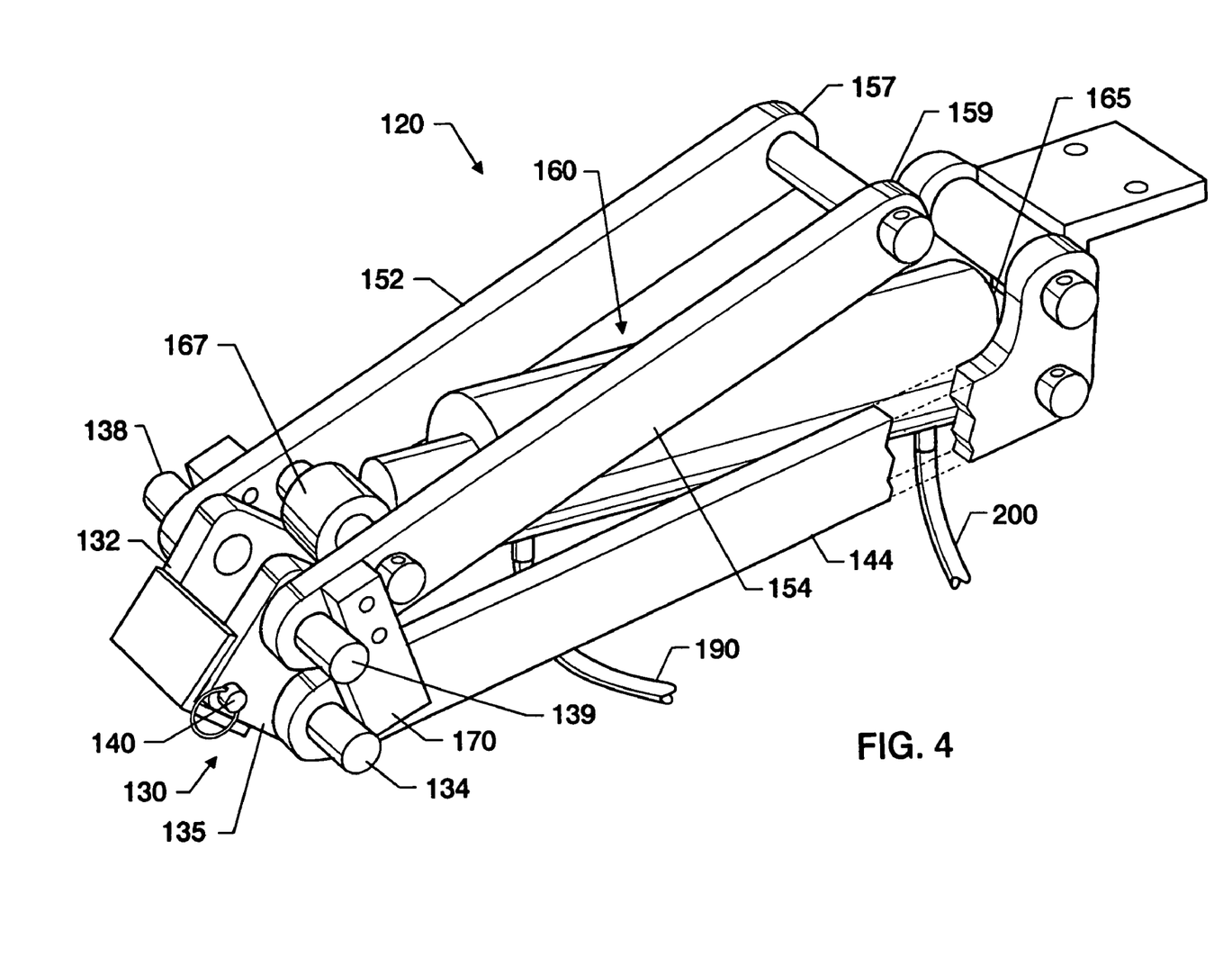
FIG. 4 is a schematic view of the scissor hoist mechanism in the closed position.
Figure 5:
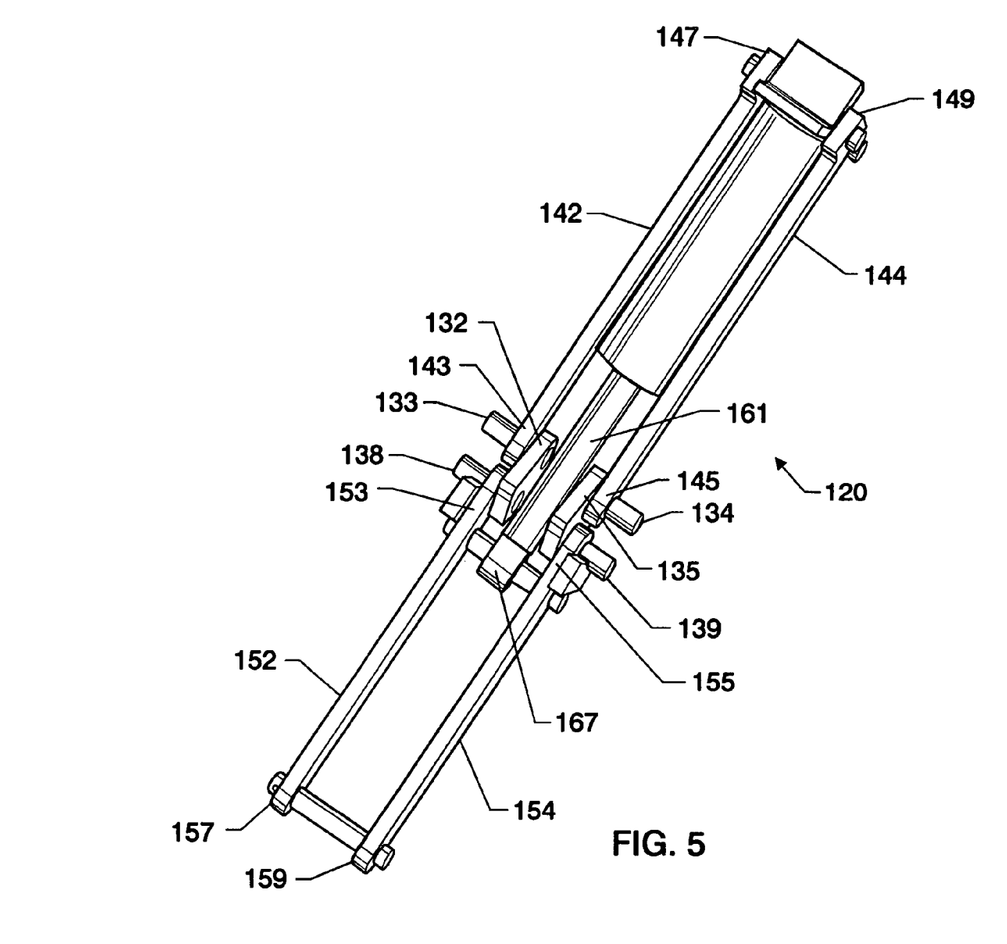
FIG. 5 is a schematic view of the scissor hoist mechanism in the open position.

The hoist 50 of the present invention may be any hoist known to those of skill in the art, but preferably comprises a scissor hoist mechanism 120 (FIGS. 4 and 5). The scissor hoist mechanism 120 comprises a channeled hinge 130 (FIG. 6) having a first upwardly extending end 132 and a second upwardly extending end 135 defining a space 137 therebetween. Referring back to FIGS. 4 and 5, each upwardly extending end 132, 135 has an upper pivot pin 138, 139 and a lower pivot pin 133, 134 extending outwardly therefrom. Two lower scissor arms 142, 144 each have a first end 143, 145 pivotally attached to a lower pivot pin 133, 134 and a second end 147, 149 pivotally attached to the vehicle frame (not shown). Two upper scissor arms 152, 154 each comprise a first end 153, 155 pivotally attached to an upper pivot pin 138, 139 and a second end 157, 159 pivotally attached to the dump body (not shown). The hoist also has a lifting means 160 for moving the scissor hoist mechanism 120 from a closed position to an open position. The lifting means 160 is disposed between the lower scissor arms 142, 144 and the upper scissor arms 152, 154. The lifting means 160 comprises a base end 165 pivotally attached to the lower scissor arms 142, 144 and an extending end 167 pivotally attached to the upper scissor arms 152, 154. Any means for pivotal attachment known to those of skill in the art may be used.

In a preferred embodiment of the invention, each second end of each upper scissor arm 157, 159 is pivotally attached to the underside of the dump body (not shown). At least one lower pivot pin 133, 134 extends beyond the corresponding lower scissor arm 142, 144. At least one upper scissor arm 152, 154 comprises a pivot block means 170 fixedly attached thereto. The pivot block means 170 selectively pivots the two upper scissor arms 152, 154 and the two lower scissor arms 142, 144 about the upper pivot pins 138, 139 and the lower pivot pins 133, 134. The pivot block means 170 maximizes the force exerted by the lifting means 160 by causing the upper scissor arms 152, 154 to rotate about the upper pivot pins 138, 139 before the lower scissor arms 142, 144 rotate about the lower pivot pins 133, 134.

The lifting means 160 has an extended position wherein an extending member 161 is disposed within the space 137 (FIG. 6) defined by the upwardly extending ends 132, 135 of the channeled hinge 130. Referring back to FIGS. 4 and 5, the extended position of the lifting means 160 orients the upper scissor arms 152, 154 at an angle of about 180 degrees in relationship to the lower scissor arms 142, 144 and reduces the size requirement of the scissor hoist mechanism that is needed to achieve an appropriate lift height. This size reduction allows installation of the scissor hoist mechanism 120 on short bed pickup trucks, something that was unachievable based on the mechanisms described in the prior art.

Any lifting means 160 may be used in the present invention. However, preferably the lifting means 160 is a hydraulic cylinder. The hydraulic cylinder may be any hydraulic cylinder known to those of skill in the art. Preferably, the hydraulic cylinder is a single acting hydraulic cylinder that has the capability to extend beyond that which is needed to fully open the scissor hoist mechanism 120. The resulting force on the opened scissor hoist mechanism 120 stabilizes the elevated dump body (not shown) by compensating for wear to the hydraulic cylinder 160, and other components of the scissor hoist mechanism 120.

Figure 7:
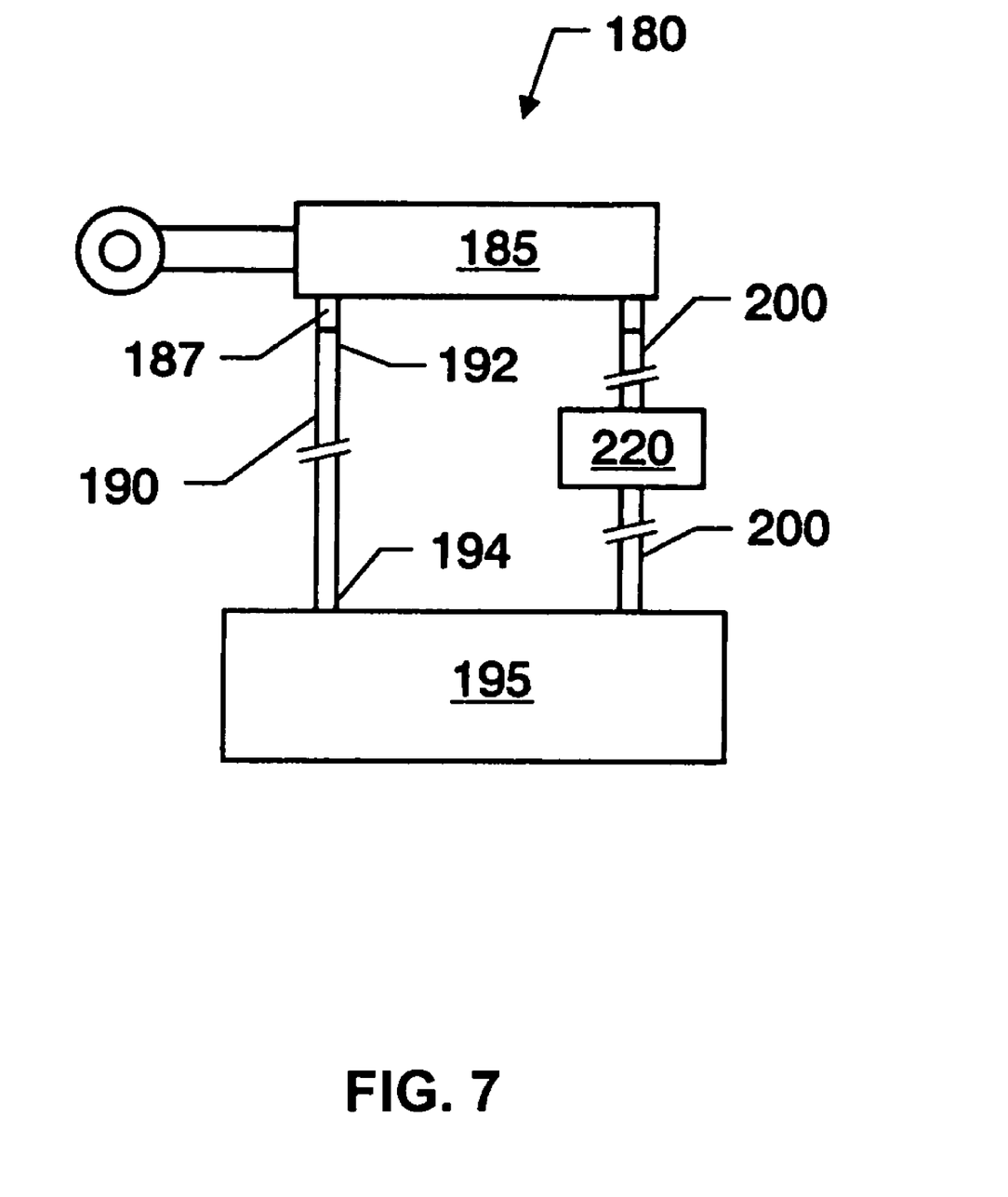
FIG. 7 is a schematic view of the hydraulic system.

FIGS. 4 and 7 illustrate a most preferred embodiment of the invention with respect to a hydraulic system 180. As the dump body (not shown) is being elevated, a hydraulic pump (not shown) supplies hydraulic fluid from a reservoir 195 through a high pressure hose 200 to a hydraulic cylinder 185. As the dump body (not shown) is being lowered, hydraulic fluid moves from the hydraulic cylinder 185 through a high pressure hose 200 and back to the reservoir 195. The high pressure hose 200 comprises an integral valve assembly 220 which provides free flow of hydraulic fluid as the dump body is being elevated, and controls the flow of hydraulic fluid as the dump body is being lowered. This allows a dump truck operator to regulate the rate of hydraulic fluid escape from the hydraulic cylinder 185 to prevent the weight of any material left in the dump body from forcing the bed to drop at an uncontrolled rate of speed. Alternatively, the valve assembly 220 may regulate hydraulic fluid flow for both raising and lowering the dump body.

A low pressure hose 190 has a first end 192 attached to an air vent 187 disposed in the hydraulic cylinder 185. The hydraulic cylinder 185 is vented through the low pressure hose 190 and outward through a second end 194 of the low pressure hose 190 into the reservoir 195. The low pressure hose 190 recycles leaked hydraulic fluid to the reservoir 195.

Figure 6:
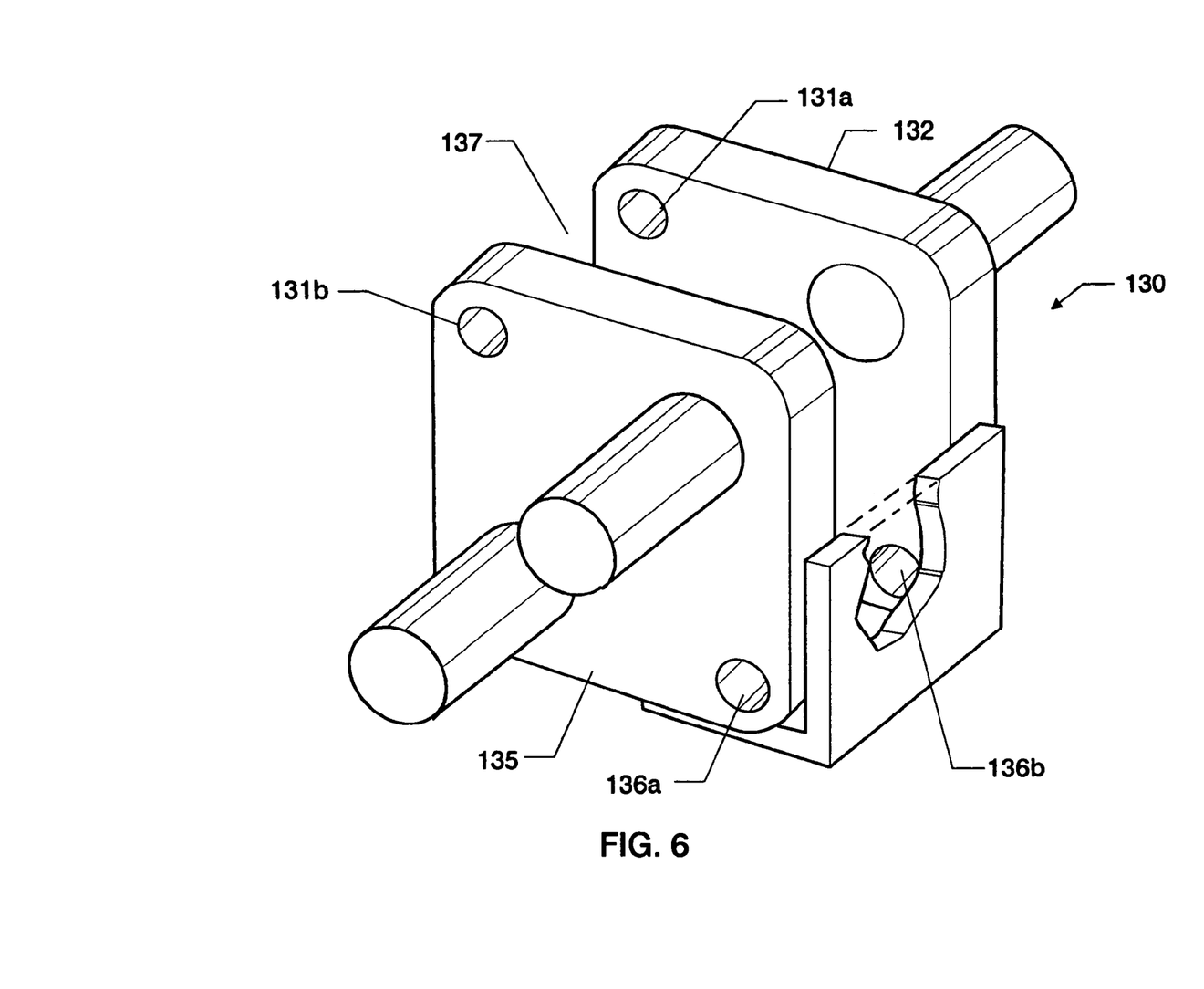
FIG. 6 is a schematic view of the channeled hinge.

Referring to FIGS. 4, 5 and 6, the channeled hinge, 130 further comprises at least one safety pin 140 for securing the scissored hoist mechanism 120 in the open position. The safety pin 140 is stored in any location that does not interfere with operation of the scissored hoist mechanism 120. A possible storage location is through a set of holes 136a, 136b in the first and second upwardly extending ends 132, 135 of the channeled hinge 130. When the dump body (not shown) is elevated, the safety pin 140 is removed from the storage location 136a, 136b and inserted through active location holes 131a, 131b. This secures the dump body (not shown) in the elevated position by retaining the extending member 161 of the lifting means 160 within the space 137 defined by the upwardly extending ends 132, 135 of the channeled hinge 130. Alternatively, one of ordinary skill in the art can identify other active safety pin locations to secure the dump body (not shown) in the elevated position by locking the upper scissor arms 152, 154 to the lower scissor arms 142, 144, or locking the upper scissor arms 152, 154, lower scissor arms 142, 144, and channeled hinge 130 together. Securing the dump body (not shown) in the elevated position is useful to prevent accidentally lowering while the vehicle is being serviced.

The invention further comprises a kit for modifying a vehicle to function as a dump truck. The kit comprises at least one hinge assembly to move a dump body between a lowered position, wherein the dump body is substantially horizontal, and a raised position, wherein a front portion of the dump body is elevated higher than a rear portion of the dump body. The rear portion of the dump body is elevated clear of a rear bumper mounted on a vehicle frame. The hinge assembly moves both the front and the rear portions of the dump body upwardly, while pivoting the dump body to the angled position. The kit further includes at least one hoist having a first means for pivotal attachment to the vehicle frame and a second means for pivotal attachment to the dump body.

In practicing the method of the present invention, a fixed bed is removed from a vehicle. A vehicle dump body elevation device comprising at least one hinge assembly is provided. The hinge assembly moves a dump body between a lowered position, wherein the dump body is substantially horizontal, and a raised position, wherein a front portion of the dump body is elevated higher than a rear portion of the dump body. The rear portion of the dump body is elevated clear of a rear bumper mounted on the vehicle frame. The hinge assembly moves both the front and the rear portions of the dump body upwardly, while pivoting the dump body to the raised position. The vehicle dump body elevation device also comprises at least one hoist having a first means for pivotal attachment to a vehicle frame and a second means for pivotal attachment to the dump body. The hinge assembly and the hoist are mounted to the vehicle frame and the dump body.

In a preferred embodiment of the invention, the hinge assembly is pivotally mounted to the vehicle frame. In addition, the hoist is pivotally mounted to the vehicle frame. The hinge assembly and the hoist are pivotally mounted to the underside of the dump body.

The method of the present invention does not require cutting, welding, removal or modification of a vehicle's original bumper, frame, trailer hitch, spare tire or exhaust system. This reduces labor cost for installation and does not alter the towing capacity or structural integrity of the vehicle. Raising the rear of the elevated dump body also increases the distance between the tailgate and the ground which facilitates complete dumping of the dump body's contents.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A vehicle dump body elevation device comprising:
    at least one hoist having a lower end pivotally attached to a vehicle frame and an upper end pivotally attached to a dump body;
    at least one hinge assembly for attaching the dump body to the vehicle frame, the hinge assembly having a lowered position wherein the dump body is substantially horizontal and a raised position wherein a front portion of the dump body is elevated higher than a rear portion of the dump body, and wherein the rear portion of the dump body is elevated clear of a rear bumper mounted on the vehicle frame;
    wherein the hinge assembly moves both the front and the rear portions of the dump body upwardly while pivoting the dump body to the raised position;
    wherein the hinge assembly comprises:
    a front link member pivotally mounted to the dump body;
    a main link member having a first end pivotally attached to the front link member, a second end pivotally mounted to the vehicle frame, and an attachment means disposed therebetween for pivotal attachment to a rear link member;
    the rear link member having a first end attached to a center linking member, and a second end pivotally mounted to the dump body; and
    wherein an end of the center linking member comprises a mounting means for attachment to the vehicle frame.

2. A vehicle dump body elevation device according to claim 1, wherein the rear link member is pivotally attached to the attachment means of the main link member at about the center of the rear link member.

3. A vehicle dump body elevation device according to claim 2, wherein the attachment means is a pivot mount fixedly attached to the main link member.

4. A vehicle dump body elevation device according to claim 1, wherein the at least one hoist is disposed between a first hinge assembly and a second hinge assembly.

5. A vehicle dump body elevation device according to claim 4, wherein the front link members are pivotally mounted to an underside of the dump body.

6. A vehicle dump body elevation device according to claim 5, wherein at least one torsion bar is disposed between and attached to the first hinge assembly and the second hinge assembly.

7. A vehicle dump body elevation device according to claim 6, wherein the center linking member comprises a first end pivotally attached to the rear link member and a second end pivotally mounted to the vehicle frame.

8. A vehicle damp body elevation device according to claim 1, wherein the hoist comprises a scissor hoist mechanism.

9. A vehicle dump body elevation device according to claim 8, wherein the scissor hoist mechanism has a range of motion up to about 180 degrees.

10. A vehicle dump body elevation device according to claim 9, wherein the scissor hoist mechanism comprises:
    a channeled hinge having a first upwardly extending end and a second upwardly extending end defining a space therebetween, wherein each upwardly extending end has an upper pivot pin and a lower pivot pin extending outwardly therefrom;
    two lower scissor arms, each comprising a first end pivotally attached to one said lower pivot pin and a second end pivotally attached to the vehicle frame;
    two upper scissor arms, each comprising a first end pivotally attached to one said upper pivot pin and a second end pivotally attached to the dump body;
    a lifting means for moving the scissor hoist mechanism from a closed position to an open position, wherein the lifting means is disposed between the lower scissor arms and the upper scissor arms, and wherein the lifting means comprises a base end pivotally attached to the lower scissor arms and an extending end pivotally attached to the upper scissor arms.

11. A vehicle dump body elevation device according to claim 10, wherein each second end of each upper scissor arm is pivotally attached to the underside of the dump body.

12. A vehicle dump body elevation device according to claim 11, wherein at least one said lower pivot pin extends beyond the corresponding lower scissor arm.

13. A vehicle dump body elevation device according to claim 12, wherein at least one said upper scissor arm comprises a pivot block means for selectively pivoting the two upper scissor arms and the two lower scissor arms about the upper pivot pins and the lower pivot pins.

14. A vehicle dump body elevation device according to claim 13, wherein the lifting means has an extended position wherein an extending member is disposed within the space defined by the upwardly extending ends of the channeled hinge.

15. A vehicle dump body elevation device according to claim 14, wherein the extended position of the lifting means orients the scissor arms at about 180 degrees.

16. A vehicle dump body elevation device according to claim 15, wherein the scissor hoist mechanism further comprises at least one safety pin for securing the hoist in the open position.

17. A vehicle dump body elevation device according to claim 15, wherein the lifting means is a hydraulic cylinder.

18. A vehicle dump body elevation device according to claim 17, wherein the hydraulic cylinder is a single acting hydraulic cylinder.

19. A vehicle dump body elevation device according to claim 18, wherein the hydraulic cylinder comprises a housing having an air vent disposed therein, and a low pressure hose having a first end attached to the air vent, wherein the hydraulic cylinder is vented through the low pressure hose, and outward through a second end of the low pressure hose into a reservoir.

20. A kit for modifying a vehicle to function as a dump truck, the kit comprising:
    at least one hoist having a first means for pivotal attachment to the vehicle frame and a second means for pivotal attachment to a dump body;
    at least one hinge assembly to move a dump, body between a lowered position, wherein the dump body is substantially horizontal, and a raised position, wherein a front portion of the dump body is elevated higher than a rear portion of the dump body, and wherein the rear portion of the dump body is elevated clear of a rear bumper mounted on a vehicle frame;
    wherein the hinge assembly moves both the front and the rear portions of the dump body upwardly, while pivoting the dump body to an angled position;
    wherein the hinge assembly comprises:
    a front link member pivotally mounted to the dump body;
    a main link member having a first end pivotally attached to the front link member, a second end pivotally mounted to the vehicle frame, and an attachment means disposed therebetween for pivotal attachment to a rear link member;
    the rear link member having a first end attached to a center linking member, and a second end pivotally mounted to the dump body; and
    wherein an end of the center linking member comprises a mounting means for attachment to the vehicle frame.

21. A kit according to claim 20, wherein the rear link member is pivotally attached to the attachment means of the main link member at about the center of the rear link member.

22. A kit according to claim 21, wherein the attachment means is a pivot mount fixedly attached to the main link member.

23. A kit according to claim 20, wherein the kit further comprises the at least one hoist disposed between a first hinge assembly and a second hinge assembly.

24. A kit according to claim 23, wherein the kit further comprises at least one torsion bar disposed between and attached to the first hinge assembly and the second hinge assembly.

25. A kit according to claim 24, wherein each front link member further comprises a first mounting means for pivotal attachment to an underside of the dump body.

26. A kit according to claim 25, wherein the center linking member is pivotally attached to the rear link member and further comprises a mounting means for pivotal attachment to the vehicle frame.

27. A kit according to claim 20, wherein the hoist is a scissor hoist mechanism.

28. A kit according to claim 27, wherein the scissor hoist mechanism has a range of motion up to about 180 degrees.

29. A kit according to claim 28, wherein the scissor hoist mechanism comprises:
    a channeled hinge having a first upwardly extending end and a second upwardly extending end defining a space therebetween, wherein each upwardly extending end has an upper pivot pin and a lower pivot pin extending outwardly therefrom;
    two lower scissor arms, each comprising a first end pivotally attached to a lower pivot pin and a second end having a lower scissor arm mounting means for pivotal attachment to the vehicle frame;
    two upper scissor arms, each comprising a first end pivotally attached to an upper pivot pin and a second end having an upper scissor arm mounting means for pivotal attachment to the dump body; and
    a lifting means for moving the scissor hoist mechanism from a closed position to an open position, wherein the lifting means is disposed between the lower scissor arms and the upper scissor arms, the lifting means having a base end pivotally attached to the lower scissor arms and an extending end pivotally attached to the upper scissor arms.

30. A kit according to claim 29, wherein each second end of each upper scissor arm mounting means is pivotally attached to the underside of the dump body.

31. A kit according to claim 30, wherein the lifting means has an extended position wherein an extending member is disposed within the space defined by the upwardly extending ends of the channeled hinge.

32. A kit according to claim 31, wherein the extended position of the lifting means orients the scissor arms at about 180 degrees.

33. A kit according to claim 32, wherein the scissor hoist mechanism further comprises at least one safety pin for securing the hoist in the open position.

34. A kit according to claim 32, wherein the lifting means is a hydraulic cylinder.

35. A kit according to claim 34, wherein the hydraulic cylinder is a single acting hydraulic cylinder.

36. A kit according to claim 35, wherein the hydraulic cylinder comprises a housing having an air vent disposed therein, and a low pressure hose having a first end attached to the air vent, wherein the hydraulic cylinder is vented through the low pressure hose, and outward through a second end of the low pressure hose into a reservoir.

37. A method of converting a fixed bed vehicle to a dump truck, the method comprising:
    a) removing a fixed bed from the fixed bed vehicle;
    b) providing a vehicle dump body elevation device comprising at least one hinge assembly to move a dump body between a lowered position wherein the dump body is substantially horizontal, and a raised position wherein a front portion of the dump body is elevated higher than a rear portion of the dump body, and wherein the rear portion of the dump body is elevated clear of a rear bumper mounted on the vehicle frame;
    wherein the hinge assembly moves both the front and the rear portions of the dump body upwardly, while pivoting the dump body to the raised position; and at least one hoist having a first means for pivotal attachment to the vehicle frame and a second means for pivotal attachment to the dump body;

c) mounting the hinge assembly to the vehicle frame wherein the hinge assembly is pivotally mounted to the vehicle frame;

d) mounting the hoist to the vehicle frame; and e) mounting the hinge assembly and the hoist to the dump body.

38. A method of converting a fixed bed vehicle to a dump truck, the method comprising:

a) removing a fixed bed from the fixed bed vehicle;

b) providing a vehicle dump body elevation device comprising at least one hinge assembly to move a dump body between a lowered position wherein the dump body is substantially horizontal, and a raised position wherein a front portion of the dump body is elevated higher than a rear portion of the dump body, and wherein the rear portion of the dump body is elevated clear of a rear bumper mounted on the vehicle frame; wherein the hinge assembly moves both the front and the rear portions of the dump body upwardly, while pivoting the dump body to the raised position; and at least one hoist having a first means for pivotal attachment to the vehicle frame and a second means for pivotal attachment to the dump body;

c) mounting the hinge assembly to the vehicle frame;

d) mounting the hoist to the vehicle frame wherein the hoist is pivotally mounted to the vehicle frame; and e) mounting the hinge assembly and the hoist to the dump body.

39. The method according to claim 38, wherein the hinge assembly and the hoist are pivotally mounted to the dump body.

40. The method according to claim 39, wherein the hinge assembly and the hoist are pivotally mounted to the underside of the dump body.

* * * * *